March 21, 1933.  G. J. THOMAS  1,902,594
BRAKE LINING TESTING
Filed Sept. 13, 1928  3 Sheets-Sheet 1

INVENTOR
George J. Thomas
BY
Jn. W. McConkey
ATTORNEY

March 21, 1933. G. J. THOMAS 1,902,594
BRAKE LINING TESTING
Filed Sept. 13, 1928 3 Sheets-Sheet 3

INVENTOR
George J. Thomas
BY
ATTORNEY

Patented Mar. 21, 1933

1,902,594

UNITED STATES PATENT OFFICE

GEORGE J. THOMAS, OF SOUTH BEND, INDIANA, ASSIGNOR TO BENDIX BRAKE COMPANY, OF SOUTH BEND, INDIANA, A CORPORATION OF ILLINOIS

BRAKE-LINING TESTING

Application filed September 13, 1928. Serial No. 305,672.

This invention relates to the testing of material such as brake lining, which is ordinarily an impregnated composition of asbestos and copper wire. An object of the invention is to provide a machine which will closely simulate the conditions of use of the lining, and which will enable an accurate measurement of the wear factor and the coefficient of friction.

In one desirable arrangement, the work is pressed against a power-driven endless band preferably of the same type of steel ordinarily used for making brake drums, and is held in a manner overcoming the frictional drag on the work. The means for holding the work includes a part, such as a spring, which yields in a manner measuring the frictional drag, and which (since the constitution of the band and the aforementioned pressing force are substantially invariable), can be calibrated to show the coefficient of friction of the lining. The wear factor is determined by direct measurement after a definite period of operation.

The above and other objects and features of the invention, including various novel and desirable details of construction, will be apparent from the following description of one illustrative embodiment shown in the accompanying drawings, in which.

The machine, in the form illustrated, includes a suitable base 10, on which there may be mounted a table or bench 12 for the convenience of the operator.

Figure 1:
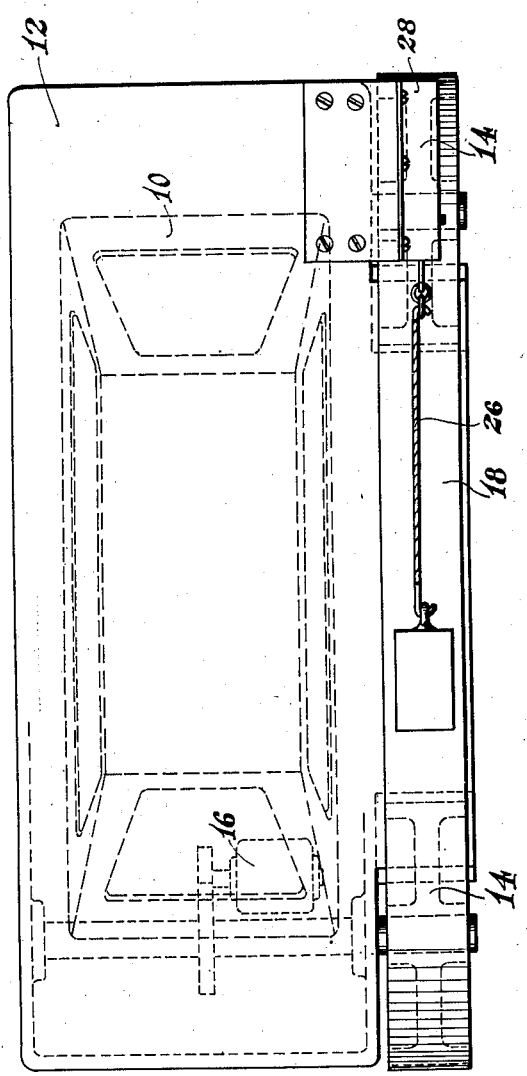
Figure 1 is a top plan view of the machine.
Figure 2:
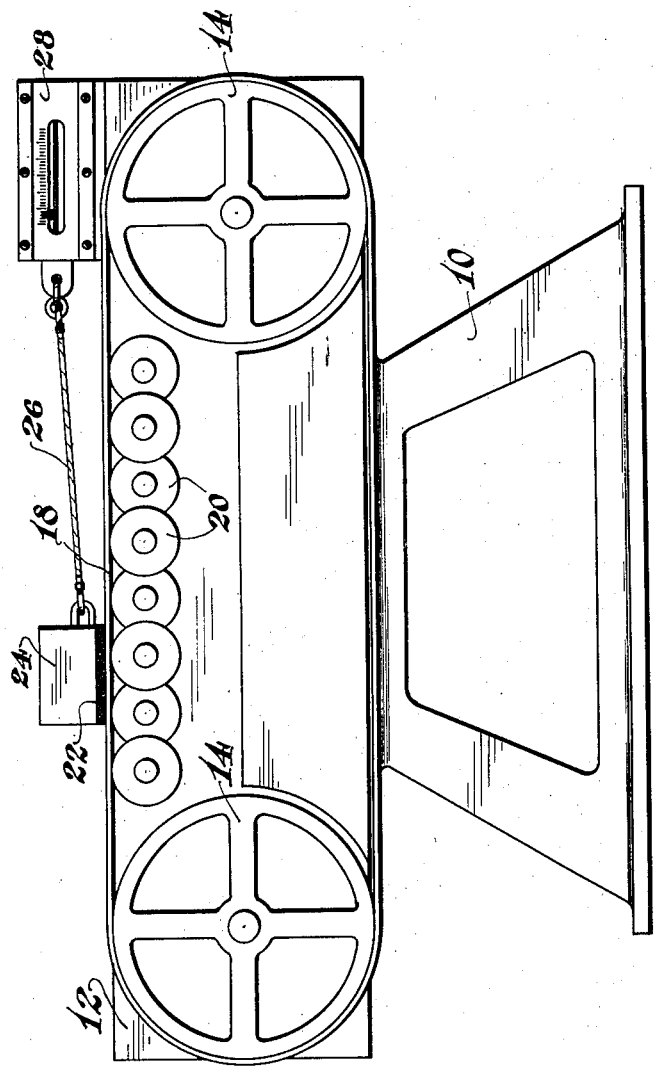
Figures 2 and 3 are side elevations of the side of the machine, showing two modifications.
Figure 3:
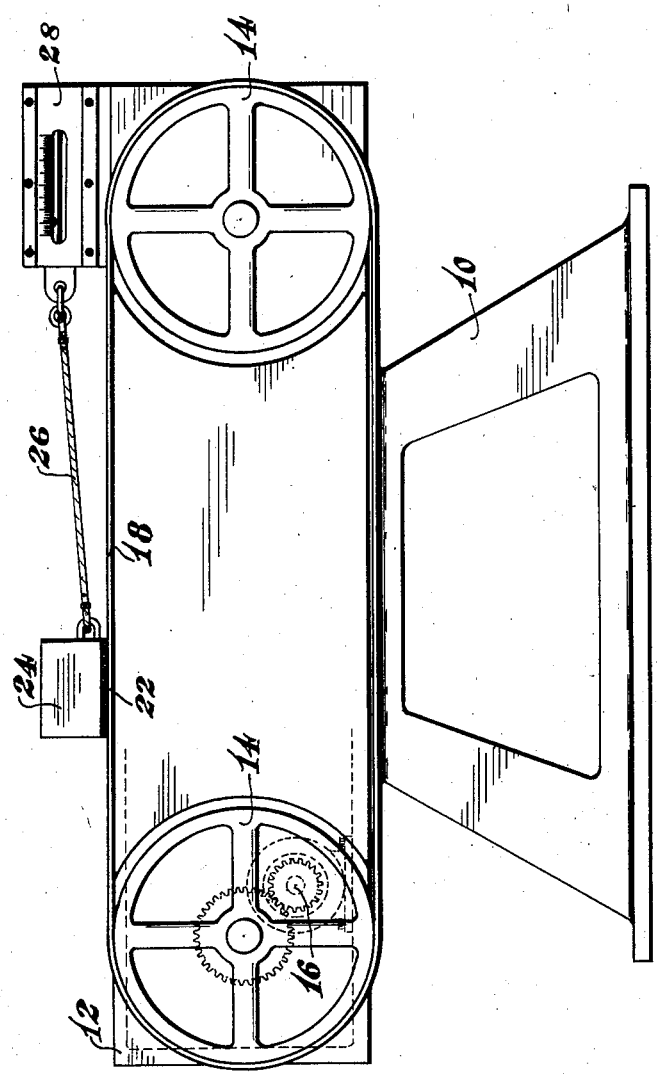

At one side of the machine are arranged two pulleys 14, one of which may be power-driven by means such as an electric motor 16, preferably of a variable-speed type so that linings may be tested at different speeds, and around which extends an endless steel band 18 having upper and lower rectilinear reaches or lengths, preferably horizontal as illustrated. In the arrangement of Figure 3, the upper reach of the band 18 is supported by a portion of the table 12, while in the arrangement of Figure 2 it is supported by a series of anti-friction rollers 20.

A piece of lining 22, or an equivalent piece of work, is held against the upper reach of band 18 by means such as a weight 24. The work is held, against the frictional drag of band 18, by means including a tension element such as a cable 26 connected to a spring scale 28. Scale 28 is not shown in detail, as it may be any usual pressure or tension measuring device, of a recording type if desired. Scale 28 is so calibrated, as explained above, as to read directly the co-efficient of friction of the lining, although for accurate use the reading will require certain corrections for temperature, etc. The wear factor is determined by direct measurement of the work after a definite run. There may be a series of bands 18 arranged side by side if a multiple machine is desired, so that a number of samples of lining may be tested at once.

While one illustrative embodiment has been described in detail, it is not my intention to limit the scope of the invention to that particular embodiment, or otherwise than by the terms of the appended claims.

I claim:

1. A machine for testing brake linings and the like comprising an endless power driven band having a rectilinear reach, means for pressing the work against said reach, and means connected to said first-mentioned means for yieldingly overcoming the frictional drag of the band on the work and measuring by its yield the frictional drag.

2. A machine for testing brake linings and the like comprising an endless power driven band having a rectilinear reach, a weight for pressing the work against said reach, and means connected to the weight for overcoming the frictional drag of the band on the work including a spring and yieldingly measuring the frictional drag.

3. A machine for testing brake linings and the like comprising an endless power driven band having a rectilinear reach, a series of rollers supporting said reach opposite the work, means for pressing the work against the reach, and means associated with the first-mentioned means for yieldingly overcoming the frictional drag of the band on the work and measuring by its yield the frictional drag.

4. A machine for testing brake linings and the like comprising a supporting member having a plane surface, an endless power driven flexible band having a reach travelling adjacent the plane of said surface to be supported thereby, means for imposing a frictional drag on said reach, and means for measuring the frictional drag imposed.

In testimony whereof, I have hereunto signed my name.

GEORGE J. THOMAS.